United States Patent
Nguyen et al.

(10) Patent No.: US 10,138,358 B2
(45) Date of Patent: Nov. 27, 2018

(54) MOLDABLE COMPOSITIONS AND METHODS OF USING THE SAME

(71) Applicant: Crayola LLC, Easton, PA (US)

(72) Inventors: Cindy Nguyen, Hazle Township, PA (US); Michael G. Moskal, Pottstown, PA (US); David Rowan, Easton, PA (US); Michael L. Spera, Mohnton, PA (US); James Broe Fitzpatrick, Kensington, MD (US)

(73) Assignee: CRAYOLA LLC, Easton, PA (US)

( * ) Notice: Subject to any disclaimer, the term of this patent is extended or adjusted under 35 U.S.C. 154(b) by 58 days.

(21) Appl. No.: 15/248,706

(22) Filed: Aug. 26, 2016

(65) Prior Publication Data

US 2017/0058109 A1    Mar. 2, 2017

Related U.S. Application Data

(60) Provisional application No. 62/210,591, filed on Aug. 27, 2015.

(51) Int. Cl.
| | |
|---|---|
| *C08L 3/02* | (2006.01) |
| *C08K 3/34* | (2006.01) |
| *C08K 3/38* | (2006.01) |
| *C08K 5/053* | (2006.01) |
| *C08L 29/04* | (2006.01) |
| *C08L 91/06* | (2006.01) |
| *A63H 33/00* | (2006.01) |

(52) U.S. Cl.
CPC .................. *C08L 3/02* (2013.01); *C08K 3/34* (2013.01); *C08K 3/38* (2013.01); *C08K 5/053* (2013.01); *C08L 29/04* (2013.01); *C08L 91/06* (2013.01); *A63H 33/001* (2013.01); *C08K 2003/387* (2013.01)

(58) Field of Classification Search
CPC .... C08L 3/02; B44C 3/04; C08K 3/38; C08K 5/053; A63H 33/001
See application file for complete search history.

(56) References Cited

U.S. PATENT DOCUMENTS

| | | | | |
|---|---|---|---|---|
| 4,584,329 | A * | 4/1986 | Gardziella | B22C 1/2233 |
| | | | | 523/145 |
| 5,171,766 | A | 12/1992 | Mariano | |
| 5,364,892 | A | 11/1994 | Miller | |
| 5,498,645 | A | 3/1996 | Mariano | |
| 5,506,280 | A | 4/1996 | Miller | |
| 5,916,949 | A | 6/1999 | Shapero | |
| 6,359,057 | B1 * | 3/2002 | Li | C08K 3/0008 |
| | | | | 324/405 |
| 6,767,938 | B1 * | 7/2004 | Cordova | C08L 5/04 |
| | | | | 524/28 |
| 2010/0064940 | A1 * | 3/2010 | Wijerama | C08L 29/04 |
| | | | | 106/287.26 |
| 2010/0251934 | A1 * | 10/2010 | Smith | C08L 99/00 |
| | | | | 106/125.1 |

FOREIGN PATENT DOCUMENTS

GB        2327086        1/1999

OTHER PUBLICATIONS

International Search Report and Written Opinion of the International Searching Authority for International Application No. PCT/US2016/048923, dated Oct. 17, 2016, 11 pages.
Tako, M., et al., "Synergistic interaction between xanthan and tara-bean gum," 1991, pp. 239-252, vol. 16(3), Carbohydrate Polymers (abstract only).
Casas, J.A., "Viscosity of guar gum and xanthan/guar gum mixture solutions," Sep. 15, 2000, pp. 1722-1727, vol. 80(12), Journal of the Science of Food and Agriculture (abstract only).
International Preliminary Report on Patentability and Written Opinion for International Application No. PCT/US2016/048923, dated Feb. 27, 2018, 8 pages.

\* cited by examiner

*Primary Examiner* — Nicholas E Hill
(74) *Attorney, Agent, or Firm* — RatnerPrestia

(57) ABSTRACT

The present invention provides moldable compositions that are capable of drying and hardening if left in open air at room temperature for a period of time. Embodiments of the moldable compositions comprise water, at least one polar polymeric resin (e.g., polyvinyl alcohol), at least one thickening agent (e.g., boric acid, borate salt, or hydrate of a borate salt), at least one humectant (e.g., glycerin, propylene glycol, etc.), at least one filler (e.g., corn starch, tapioca, or arrowroot), optionally at least one releasing agent (e.g., mineral oil) and optionally at least one additive.

17 Claims, No Drawings

MOLDABLE COMPOSITIONS AND METHODS OF USING THE SAME

CROSS-REFERENCE TO RELATED APPLICATION

This application is related to and claims the benefit of priority of U.S. Provisional Application No. 62/210,591, entitled MOLDABLE COMPOSITIONS AND METHODS OF USING THE SAME, filed on Aug. 27, 2015, the disclosure of which is incorporated herein by reference in its entirety for all purposes.

FIELD OF THE INVENTION

The present invention relates generally to moldable compositions for use as a children's craft product, and more particularly to moldable compositions that can harden in air or in an oven.

BACKGROUND OF THE INVENTION

Many different types of modeling compositions for creating figures or sculptures have been introduced over time, particularly for use as craft products by children, and for general artistic purposes. U.S. patents which relate to moldable compositions include U.S. Pat. No. 6,359,057 to Li, U.S. Pat. No. 5,171,766 to Mariano et al., U.S. Pat. No. 5,364,892 to Miller et al., U.S. Pat. No. 5,498,645 to Mariano et al., and U.S. Pat. No. 5,506,280 to Miller et al., which are incorporated by reference herein.

Some moldable compositions utilize "polymer clay technology," whereby particles of polyvinyl chloride (PVC) are plasticized with typical plasticizers (e.g., phthalates, diesters, triesters, etc), and heating these compositions in the oven melts the PVC particles to form a hardened article. A drawback of this technology is that polymer clay must be hardened in an oven at an elevated temperature, and there is a risk of thermal degradation of the PVC which releases hazardous HCl. Also, polymer clay requires kneading or other physical manipulation to make it soft and pliable for use.

There remains a need for moldable compositions that overcome these drawbacks by having the ability to harden at ambient temperature (i.e., by air-drying), that are already soft so that they require no kneading prior to use, and that do not release HCl or easily thermally degrade.

SUMMARY OF THE INVENTION

An embodiment of the present invention provides a moldable composition comprising, consisting essentially of, or consisting of water, at least one polar polymeric resin (e.g., polyvinyl alcohol), at least one thickening agent (e.g., boric acid, borate salt, or hydrate of a borate salt), at least one humectant (e.g., glycerin, propylene glycol, etc.), at least one filler (e.g., corn starch), optionally at least one releasing agent (e.g., mineral oil) and optionally at least one additive (e.g., selected from the group consisting of pH adjusters, defoamers, dispersants, fungicides, pesticides, antimicrobial agents, colorants and scents).

Another embodiment of the present invention provides a method of using the moldable composition comprising molding the moldable composition into a desired shape, and drying the moldable composition so that it forms a hardened composition.

DETAILED DESCRIPTION OF THE INVENTION

Embodiments of the present invention relate to moldable compositions that can harden at ambient temperature (i.e., by air-drying), that are already soft so that they require no kneading prior to use, and that do not release HCl or easily thermally degrade. Air drying of the moldable compositions, while taking longer than oven drying, is a safety factor which will broaden the appeal and utility of the product to young children, as the risk of burning occurring with the use of an oven is not present.

According to particular embodiments, moldable compositions of the present invention include polyvinyl alcohol (PVOH) that has been thickened by a borate compound (e.g., a borate salt). Preferably, the borate does not cure or harden the composition, but merely serves to stiffen the polymer into a gel. Preferably, there is no chemical bond between the polymer chains, (i.e. negligible crosslinking or no actual crosslinking), but rather a strong association between polymer chains within the system, whereby the structure demonstrates superior pliability compared to conventional water-based starch doughs because of the presence of a network of intermolecular attractions, instead of crosslinked chemical bonds. According to preferred embodiments, crosslinking is kept to a minimum (preferably to a negligible amount, and most preferably, none).

The compositions have a hardening characteristic, which means that they are initially moldable but are capable of drying and hardening if left in open air at room temperature for a period of time (i.e., left outside of any enclosure, such as a container, that would substantially prevent moisture from evaporating off of the composition), so that they maintain the achieved shape.

According to particular embodiments, the moldable composition of the present invention comprises water, at least one polar polymeric resin (e.g., polyvinyl alcohol), at least one thickening agent (e.g., boric acid, borate salt, or hydrate of a borate salt), at least one humectant (e.g., glycerin, propylene glycol, etc.), at least one filler (e.g., corn starch), optionally at least one releasing agent (e.g., mineral oil) and optionally at least one additive (e.g., selected from the group consisting of pH adjusters, defoamers, dispersants, fungicides, pesticides, antimicrobial agents, colorants and scents).

The moldable composition may comprise, consist essentially of, or consist of between about 15 wt % to about 60 wt % water, between about 1 wt % to about 20 wt % humectant(s) (e.g., glycerin, propylene glycol, etc.), between about 0.1 wt % to about 10 wt % polyvinyl alcohol, between about 0.01 wt % to about 5 wt % thickening agent(s) (e.g., borate compound), between about 20 wt % to about 75 wt % filler(s) (e.g., corn starch), optionally between about 0.1 wt % to about 10 wt % releasing agent(s) (e.g., mineral oil), and optionally between about 0.1 wt % to about 5 wt % additives (e.g., selected from the group consisting of pH adjusters, defoamers, dispersants, fungicides, pesticides, antimicrobial agents, colorants and scents).

Alternatively, the moldable composition may comprise, consist essentially of, or consist of between about 20 wt % to about 35 wt % water, between about 1 wt % to about 15 wt % humectant(s) (e.g., glycerin), between about 1 wt % to about 6 wt % polyvinyl alcohol, between about 0.1 wt % to about 3 wt % thickening agent(s) (e.g., borate compound), between about 35 wt % to about 65 wt % filler(s) (e.g., corn starch), optionally between about 1 wt % to about 6 wt % releasing agent(s) (e.g., mineral oil), and optionally between about 0.1 wt % to about 3 wt % additives (e.g., selected from the group consisting of pH adjusters, defoamers, dispersants, fungicides, pesticides, antimicrobial agents, colorants and scents).

The compositions of the present invention include a sufficient amount of water to act as a solvent for the other components, but preferably not so much water that the compositions shrink substantially after the water evaporates. The compositions preferably maintain a high dry strength upon hardening. In particular embodiments, compositions of the present invention comprise between about 15 wt % to about 60 wt % water, or between about 20 wt % to about 35 wt % water, or between about 25 wt % to about 30 wt % water. The amount of water in the composition may decrease over time as the composition is left in open air and the water evaporates.

The compositions of the present invention include a polar polymeric resin as a binder. According to particular embodiments, the polar polymeric resin is polyvinyl alcohol (PVOH). However, other polar polymeric resins known by those skilled in the art may also be used. In certain embodiments, compositions of the present invention comprise between about 0.1 wt % to about 10 wt % polar polymeric resin, or between about 1 wt % to about 6 wt % polar polymeric resin, or between about 2 wt % to about 5 wt % polar polymeric resin.

PVOH is made by the hydrolysis of poly(vinyl acetate) and, when commercially purchased, may be partially or fully hydrolyzed. PVOH varies in molecular weight according to the length of the resin chain. In a particular embodiment, the composition includes PVOH which is partially hydrolyzed (about 80% to about 95%, or about 85% to about 90%, or about 87% to about 89% hydrolyzed). A particularly preferred type of PVOH is Celvol® 523.

The compositions of the present invention include one or more thickening agents. The one or more thickening agents preferably comprise a boric compound, such as boric acid, a borate salt, or a hydrate of a borate salt (e.g., ammonium borate, zinc borate, sodium borate, sodium aluminate, ammonium pentaborate tetrahydrate, etc.). The compositions of the present invention may also include thickening agents such as guar gum and/or xanthan gum, which may interact with boric compounds to provide a thickening function with slight or minimal crosslinking. Non-limiting examples of other thickening agents include titanates, vanadates and zincates (e.g., those commercially available under the Tyzor® tradename), dialdehydes such as glutaraldehyde, polyfunctional acids such as adipic and citric acids, polyfunctional acid anhydrides such as trimellitic anhydride, non-monovalent cations such as $Ca^{2+}$, $Fe^{3+}$, etc. In certain embodiments, compositions of the present invention comprise between about 0.01 wt % to about 5 wt % thickening agent(s), or between about 0.1 wt % to about 3 wt % thickening agent(s), or between about 0.1 wt % to about 0.5 wt % thickening agent(s).

In particular embodiments, compositions of the present invention comprise one or more humectants. Humectants inhibit drying and increase the amount of time that the composition remains moldable prior to drying and becoming hardened. A wide variety of humectant materials may be employed; for example, the humectant may be selected from the group consisting of glycerin, propylene glycol, triglycerol, poly(ethylene glycol), diethylene glycol, and combinations thereof. In a particular embodiment, the composition includes glycerin and propylene glycol as humectants. The composition preferably includes between about 1 wt % to about 20 wt % humectant(s), or between about 1 wt % to about 15 wt % humectant(s), or between about 5 wt % to about 12 wt % humectant(s).

The compositions of the present invention include at least one filler. According to particular embodiments, fillers may be selected from the group consisting of starch (e.g., corn starch, arrowroot, or tapioca), calcium carbonate, cellulose fibers, talc, mica, clays (e.g., Bentonite clay), silicates, and mixtures thereof. In a preferred embodiment, the filler is corn starch. In another preferred embodiment, the filler includes arrowroot and/or tapioca. In a particular embodiment, the composition includes between about 20 wt % to about 75 wt % filler(s), or between about 30 wt % to about 65 wt % filler(s), or between about 45 wt % to about 60 wt % filler(s).

According to certain embodiments, compositions of the present invention include at least one releasing agent to reduce tackiness. Typical releasing agents include mineral oil, petrolatum, silicone wax, etc. In a preferred embodiment, the releasing agent is mineral oil. In a particular embodiment, the composition includes between about 0.1 wt % to about 10 wt % releasing agent(s), or between about 1 wt % to about 6 wt % releasing agent(s), or between about 1.5 wt % to about 3.5 wt % releasing agent(s).

According to certain embodiments, compositions of the present invention include one or more additional additives. These additives may include, but are not limited to, pH adjusters, defoamers, dispersing agents, scents, glitter, preservatives (e.g., fungicides, pesticides, antimicrobial agents, etc.), and/or colorants. The compositions may comprise less than about 1% additives, or less than about 0.9% additives, or less than about 0.8% additives. In particular embodiments, the compositions of the present invention comprise between about 0.1% to about 5% additives, or between about 0.1% to about 3% additives, or between about 0.1% to about 1% additives.

Such additives are readily available from numerous sources. Common pH adjusters include phosphoric acid and triethanolamine. Defoamers, such as Foamex® 825, can be added to eliminate air bubbles upon mixing of the components. One or more preservatives, such as anti-microbial agents and fungicides, can be added to increase the shelf life of the composition. Some examples of preservatives include Fungitrol® 940, Kathon® LX, Nuosept® 95, Acticide® LA, and Polyphase® P100. One or more colorants, such as pigments or dyes, may optionally be used in the composition. A scent or fragrance may also be added to the composition.

According to certain embodiments, compositions of the present invention include agents that may function in more than one capacity. For example, arrowroot may function primarily as a filler in the compositions of the present invention, but can also provide some slight function as a thickening agent and/or a humectant.

According to one embodiment, the moldable composition comprises, consists essentially of, or consists of: water; glycerin; polyvinyl alcohol; propylene glycol; at least one filler selected from the group consisting of corn starch, tapioca, clay and a combination thereof; mineral oil; at least one borate compound (e.g., ammonium borate) and at least one additive selected from the group consisting of pH adjusters, defoamers, dispersants, preservatives (e.g., fungicides, pesticides, antimicrobial agents), colorants and scents.

Advantageously, there are ingredients in other commercially available moldable compositions which are not included in compositions of the present invention. In a particular embodiment, the composition does not include any cellulose gum or hydroxypropyl cellulose. In additional embodiments, the composition does not include any microspheres, as they are defined in U.S. Pat. No. 6,359,057, which is incorporated by reference herein.

A method according to the present invention comprises combining all of the components of the compositions described above and thoroughly mixing them until they display a substantially uniform color, consistency, and texture. According to certain aspects of the present invention, a method for making a moldable composition comprises mixing the components of the compositions described above, namely, water, at least one polar polymeric resin, at least one thickening agent, at least one humectant, at least one filler, optionally at least one releasing agent, and optionally at least one additive (e.g., one or more pH adjusters, buffers, defoamers, dispersing agents, scents, preservatives, colorants, glitter or a combination thereof) in the weight percentages described above. According to particular embodiments, the mixing is carried out at room temperature (i.e., the method is free of any heating steps).

According to one embodiment, the method comprises mixing water, polyvinyl alcohol, glycerin, anti-foam agent(s), dispersant(s), preservative(s), and pH buffer (e.g., phosphoric acid), corn starch, mineral oil, water, and a borate salt (e.g., ammonium borate or "NH4 borate" as used herein) until a substantially homogeneous composition results. The order of mixing ingredients can vary. According to another embodiment, the method includes mixing this homogeneous composition with a further boric compound (e.g., ammonium pentaborate tetrahydrate), water, a further humectant (e.g., propylene glycol), a further pH buffer/adjuster (e.g., triethanolamine), a further filler (e.g., arrowroot and/or tapioca), a further thickening agent (e.g., guar gum and/or xanthan gum), and additional releasing agent (e.g., mineral oil). The order of mixing these ingredients with the homogeneous composition may also vary.

A method for using a moldable composition of the present invention comprises molding the moldable composition into a desired shape, and exposing the moldable composition to air (e.g., ambient air at room temperature, about 20° C.-about 25° C., or in an oven that is heated to a temperature greater than room temperature), for a period of time sufficient for the moldable composition to become a hardened composition (i.e., exposing the composition to air comprises leaving the moldable composition outside of any enclosure, such as a container, that would substantially prevent moisture from evaporating off of the composition), wherein the moldable composition comprises any of the moldable compositions described herein.

According to alternative embodiments, additional modifications may be made to the composition after it has been molded into a desired shape. For example, the method may further comprise adding a decorative agent to the composition, either before or after it has hardened. The decorative agent may be selected from the group consisting of glaze, paint, glitter, shimmer, and a combination thereof. After the composition has hardened, the method may further comprise chiseling the hardened composition (e.g., to add texture), further sculpting the hardened composition, or piercing the hardened composition and threading it onto a string to use it as a bead.

As used herein, a percentage (%) refers to a weight percentage of the composition (with the "composition" referring to all of the components in the total composition, including any components that are premixed prior to being combined with the rest of the components), unless indicated otherwise.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention.

The following examples are provided to describe the invention in greater detail and are intended to illustrate, not limit, the invention.

EXAMPLES

While exemplary compositions are set forth below, alternative compositions will be apparent to those skilled in the art. Such artisans will be able to modify the compositions with an eye toward the desired performance properties and intended use.

Example 1

The moldable composition shown in Table 1 was made according to the following method. A mixture ("PVA Premix") comprising water, polyvinyl alcohol, glycerin, propylene glycol, defoamer, dispersant, preservatives (fungicide, pesticide), and phosphoric acid were added to a mixing vessel. Cornstarch (C+) and mineral oil were then added to the PVA Premix, followed by ammonium borate. This order of mixing can be modified, as needed. The mixture was kneaded for approximately 5-6 minutes until it became substantially homogeneous.

TABLE 1

| Component | | Weight Percentage (wt %) |
|---|---|---|
| City Water | | 27.53 |
| Glycerin (humectant) | | 4.41 |
| Foamex® 825 (defoamer) | "PVA Premix" | 0.22 |
| Hydropalat® 44 (dispersant/anionic electrolyte) | | 0.44 |
| Celvol® 523 Polyvinyl Alcohol | | 3.08 |
| Propylene Glycol (humectant) | | 4.66 |
| Fungitrol® 940 (fungicide) | | 0.37 |
| Acticide® LA (pesticide) | | 0.12 |
| Phosphoric Acid (62%) (pH adjuster) | | 0.2 |
| C+® Corn Starch (filler) | | 55.85 |
| Mineral Oil (releasing agent) | | 2.88 |
| Ammonium Borate (thickening agent) | | 0.24 |
| Total | | 100.0 |

Example 2

Additional exemplary moldable compositions are shown in Tables 2, 3, and 4 below. The compositions included the same "PVA Premix" described in Example 1. The fillers used in the composition shown in Table 3 included tapioca and arrowroot starch, as well as Bentonite clay. "TEA" stands for triethanolamine. "AMPBTH" stands for ammonium pentaborate tetrahydrate.

TABLE 2

| Name | Quantity (g) | % by Weight |
| --- | --- | --- |
| Tapioca | 20 | 33.95% |
| C+ | 5 | 8.49% |
| Guar Gum | 3 | 5.09% |
| PVA Premix | 24.3 | 41.25% |
| Mineral Oil | 2 | 3.40% |
| NH₄ Borate | 0.21 | 0.36% |
| City Water | 3.5 | 5.94% |
| Propylene Glycol | 0.9 | 1.53% |
| Total | 58.91 | 100.00% |

TABLE 3

| Name | Quantity (g) | % by Weight |
| --- | --- | --- |
| Tapioca | 30 | 31.88% |
| Arrowroot | 20 | 21.25% |
| Bentonite | 2 | 2.13% |
| TEA | 0.6 | 0.64% |
| PVA Premix | 35 | 37.19% |
| Mineral Oil | 2 | 2.13% |
| NH₄ Borate | 0.5 | 0.53% |
| City Water | 4 | 4.25% |
| Total | 94.1 | 100.00% |

TABLE 4

| Name | % by Weight |
| --- | --- |
| AMPBTH | 0.50% |
| City Water | 5.03% |
| Propylene Glycol | 2.02% |
| TEA | 0.91% |
| Arrowroot | 12.10% |
| Tapioca | 39.31% |
| Guar Gum | 0.81% |
| Xanthan Gum | 0.71% |
| Color | As desired |
| Mineral Oil | 3.33% |
| PVA Premix | 35.28% |
| Total | 100% |

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed is:

1. A moldable composition comprising:
water,
at least one polar polymeric resin,
at least one thickening agent comprising:
    guar gum,
    xanthan gum, and
    a borate salt or hydrate of a borate salt, wherein the borate salt or the hydrate of a borate salt is selected from the group consisting of ammonium borate, zinc borate, sodium borate, and ammonium pentaborate tetrahydrate,
at least one humectant,
at least one filler excluding microsphere fillers,
optionally at least one releasing agent and
optionally at least one additive.

2. The moldable composition of claim 1, wherein the at least one polar polymeric resin comprises polyvinyl alcohol.

3. The moldable composition of claim 1, wherein the at least one thickening agent further comprises boric acid, a borate salt, or a hydrate of a borate salt.

4. The moldable composition of claim 1, wherein the at least one humectant comprises glycerin and polyethylene glycol.

5. The moldable composition of claim 1, wherein the at least one filler comprises corn starch.

6. The moldable composition of claim 1, wherein the at least one releasing agent comprises mineral oil.

7. The moldable composition of claim 1, wherein the moldable composition comprises at least one optional additive, the at least one optional additive selected from the group consisting of pH adjusters, defoamers, dispersants, preservatives, colorants and scents.

8. The moldable composition of claim 1, wherein the at least one filler comprises at least one of arrowroot or tapioca.

9. The moldable composition of claim 1, wherein the moldable composition comprises water; the at least one humectant comprising glycerin and propylene glycol; the at least one polar polymeric resin comprising polyvinyl alcohol; the at least one filler selected from the group consisting of corn starch, tapioca, arrowroot, clay and a combination thereof; the at least one optional releasing agent comprising mineral oil; the at least one thickening agent comprising a boric compound and the at least one optional additive selected from the group consisting of pH adjusters, defoamers, dispersants, preservatives, colorants and scents.

10. The moldable composition of claim 1, wherein the moldable composition comprises water; the at least one humectant comprising glycerin and propylene glycol; the at least one polar polymeric resin comprising polyvinyl alcohol; the at least one filler selected from the group consisting of corn starch, tapioca, arrowroot, clay or any combination thereof; the at least one optional releasing agent comprising mineral oil; the at least one thickening agent; and the at least one optional additive selected from the group consisting of pH adjusters, defoamers, dispersants, preservatives, colorants and scents.

11. The moldable composition of claim 1 comprising between about 15 wt % to about 60 wt % water, between about 1 wt % to about 20 wt % humectant, between about 0.1 wt % to about 10 wt % of the at least one polar polymeric resin comprising polyvinyl alcohol, between about 0.01 wt % to about 5 wt % of the at least one thickening agent, between about 20 wt % to about 75 wt % of the at least one filler, between about 0.1 wt % to about 10 wt % of the at least one optional releasing agent, and between about 0.1 wt % to about 5 wt % of the at least one optional additive.

12. The moldable composition of claim 1 comprising between about 20 wt % to about 35 wt % water, between about 1 wt % to about 15 wt % humectant, between about 1 wt % to about 6 wt % of the at least one polar polymeric resin comprising polyvinyl alcohol, between about 0.1 wt % to about 3 wt % of the at least one thickening agent, between about 35 wt % to about 65 wt % of the at least one filler, between about 1 wt % to about 6 wt % of the at least one optional releasing agent, and between about 0.1 wt % to about 3 wt % of the at least one optional additive.

13. A method of making the moldable composition of claim 1 comprising mixing the water, at least one polar polymeric resin, at least one thickening agent, at least one humectant, at least one filler, at least one releasing agent and at least one additive together.

14. A method of using the moldable composition of claim 1 comprising molding the moldable composition into a desired shape.

15. The method of using the moldable composition of claim 14 further comprising drying the moldable composition to form a hardened composition.

16. The method of using the moldable composition of claim 15 further comprising adding a decorative agent to the hardened composition.

17. A moldable composition comprising:
water;
at least one polar polymeric resin comprising polyvinyl alcohol;
at least one thickening agent comprising:
  guar gum,
  xanthan gum, and
  a boric compound, wherein the at least one boric compound is ammonium pentaborate tetrahydrate;
at least one humectant, comprising glycerin and propylene glycol;
at least one filler excluding microsphere fillers, the at least one filler selected from the group consisting of corn starch, tapioca, arrowroot, clay and a combination thereof;
optionally at least one releasing agent comprising mineral oil; and
optionally at least one additive selected from the group consisting of pH adjusters, defoamers, dispersants, preservatives, colorants and scents.

* * * * *